United States Patent [19]

Coulmance

[11] Patent Number: 4,626,626
[45] Date of Patent: Dec. 2, 1986

[54] INTERFACE FOR A TELEPHONE SET

[75] Inventor: Jean-Pierre Coulmance, Osny, France

[73] Assignee: U.S. Philips Corporation, New York, N.Y.

[21] Appl. No.: 678,608

[22] Filed: Dec. 6, 1984

[51] Int. Cl.⁴ .................................. H04M 3/00
[52] U.S. Cl. ................................. 379/394; 379/413
[58] Field of Search ........... 179/16 AA, 16 F, 18 FA, 179/81 R

[56] References Cited

U.S. PATENT DOCUMENTS

| | | | |
|---|---|---|---|
| 4,079,211 | 3/1978 | Janssen | 179/81 R |
| 4,354,060 | 10/1982 | Niertit et al. | 179/81 R |
| 4,360,710 | 11/1982 | Chaput et al. | 179/81 R |
| 4,440,979 | 4/1984 | McGibbon et al. | 179/16 EA |

FOREIGN PATENT DOCUMENTS 0023714  2/1981  European Pat. Off. .......... 179/81 R Primary Examiner—Gene Z. Rubinson
Assistant Examiner—R. Vaas
Attorney, Agent, or Firm—Thomas A. Briody; William J. Streeter; Leroy Eason

[57] ABSTRACT

An interface is arranged between an integrated circuit which is provided for a 5 volt supply voltage and a variable-voltage telephone line. This circuit employs an MOS transistor whose current is controlled by a current regulating transistor and a current measuring resistor and includes a negative voltage feedback path for alternating current. A time constant is provided in order to disable the action of the current regulating transistor for transient or alternating currents.

11 Claims, 3 Drawing Figures

FIG.1A
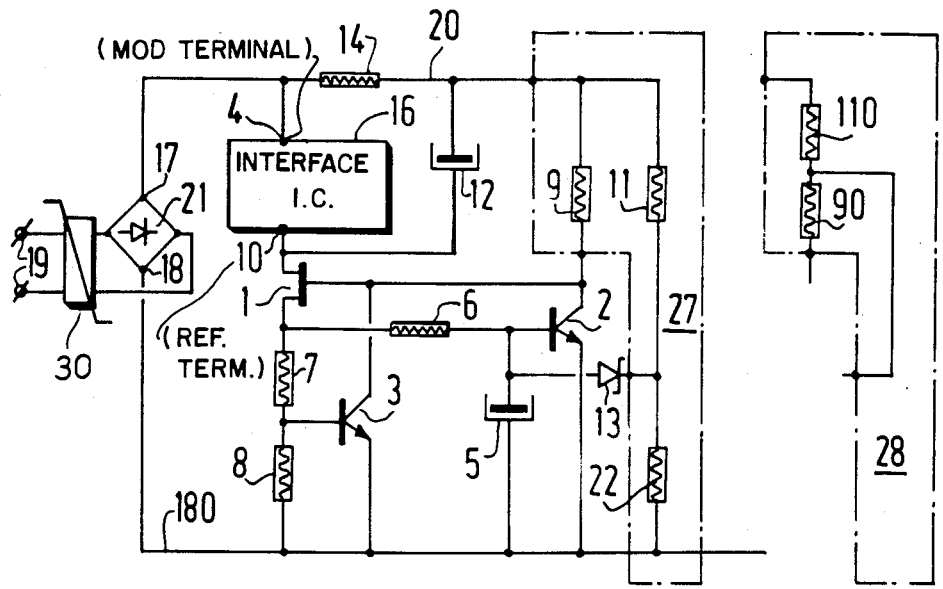
FIG.1B
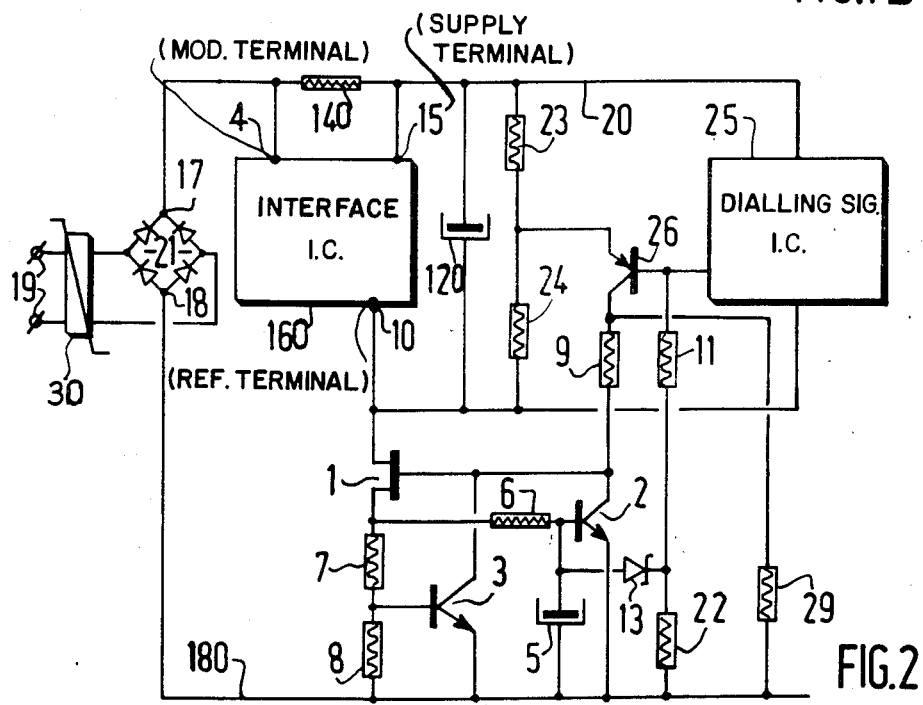
FIG.2

INTERFACE FOR A TELEPHONE SET

BACKGROUND OF THE INVENTION

1. Field of the Invention

The invention relates to an electronic interface for a telephone set comprising an integrated circuit. In particular, it relates to an integrated circuit which performs the majority of modulation functions in the set on signals transmitted over the telephone line.

2. Description of the Prior Art

This type of integrated circuit is generally provided in one diagonal of a rectifier bridge to whose other diagonal the telephone line is connected. It has at least two terminals, a modulated signal terminal and a reference terminal, respectively.

Examples of such interfaces are disclosed in application diagrams published with the specifications of the integrated circuits TEA 1046 or TEA 1060, in the form of special instalments, or in the handbook "Components for telephony" published by the firm of PHILIPS.

However, certain standards relating to telephones require the current consumed by the line when the set is in the off-hook condition to be limited, and these standards are not fully taken into account in the above-mentioned application diagrams. They disclose an arrangement formed by a first field-effect transistor in series with a current measuring resistor between the integrated circuit and the rectifier bridge, and a second transistor whose emitter-base junction is in parallel with the current measuring resistor, the collector being connected to the control electrode of the first transistor. This basic arrangement satisfies however only part of the requirements of the standards. It has therefore been necessary to provide a plurality of additional circuits, each satisfying a specific requirement of the standards.

SUMMARY OF THE INVENTION

The invention has for its object to provide, with only some simple alterations in the basic arrangement and without additional functional circuits, an arrangement which satisfies all the requirements of the standards and is suitable for use in any type of integrated circuits and can be easily adapted to all subsequent changes in the values imposed by the standard.

Thus, in an arrangement according to the invention the control electrode, or grid, of the first transistor and the collector of the second transistor are connected together via two series-arranged load resistors to the modulation terminal of the integrated circuit, and the junction of the two series-arranged load resistors is connected to the reference terminal of the integrated circuit via a coupling capacitor.

As the connection to the integrated circuit is made via its modulating terminal, it is necessary that an a.c. voltage applied to its terminals is not opposed by the current regulating circuit. The circuit according to the invention renders it possible to obtain this effect in the simplest way.

In an improved embodiment of the arrangement according to the invention, the base-emitter junction of the second transistor is shunted by a timing capacitor, a resistor is arranged between the base of this second transistor and the current measuring resistor means, the latter being formed by two series-arranged measuring resistors, and a third transistor is provided which has its emitter, its base and its collector connected to the rectifying bridge, to the junction of the two series-arranged measuring resistors and to the collector of the second transistor, respectively.

This arrangement further decreases the influence of the alternating current regulating circuit while assuring that transient overvoltages applied to the line do not produce currents exceeding a predetermined value.

In a further improvement of the arrangement, the anode of a Zener diode is connected to the base of the second transistor, the cathode being connected to the junction of the two series connected load resistors.

This arrangement limits the power dissipated by the first transistor in the event of significant and prolonged overvoltages, at a very low additional cost.

The following description, which is given by way of non-limitative example with reference to the accompanying Figures will make it better understood how the invention can be put into effect.

BRIEF DESCRIPTION OF THE DRAWING

FIG. 1A shows a circuit diagram of the apparatus according to the invention, and FIG. 1B show an alternative form of a portion of the circuit of FIG. 1A.

FIG. 2 shows a variation of the circuit diagram of FIG. 1.

DESCRIPTION OF THE PREFERRED EMBODIMENTS

In FIG. 1, reference numeral 16 denotes the integrated circuit and the reference numerals 4, 10 denote the modulation and reference terminals, respectively.

The integrated circuit 16 is arranged in a diagonal of a rectifier bridge 21, to whose other diagonal a telephone line 19 is connected.

The integrated circuit, for example of the type TEA 1046, produced by PHILIPS, receives or transmits via the line a modulation signal between its modulating terminal 4 and its reference terminal 10, and is also fed with direct current between these terminals. The modulating terminal is consequently connected to a conductor of the line at a terminal 17 of the rectifier bridge. The so-called "reference" terminal may functionally be connected to the other wire of the line. However, because of the fact that the integrated circuit has for its object to produce at its terminals a fixed voltage whereas the line furnishes, for example in accordance with the French standard, a variable d.c. voltage for which a constant current less than 60 mA must be maintained, a transistor 1 is added, arranged in series, in the assembly to compensate for the voltage deviations and to ensure current regulation.

Thus, the assembly comprises an interface formed by a first N-channel high-voltage field effect transistor 1, whose main current path is arranged in series with a current measuring resistor (formed here by two resistors 7, 8), between the reference terminal 10 of the integrated circuit 16 and a line 180 connected to the negative output 18 of the rectifier bridge 21, and a second bipolar NPN transistor 2, whose base-emitter junction is arranged in parallel with current measuring resistors 7, 8 and whose collector is connected to the gate of field effect transistor 1. This conventional arrangement functions as follows: when the line current, which flows through the resistors 7, 8 exceeds a certain value, for example 35 mA, the voltage drop across the measuring resistor reaches approximately 0.6 Volt and the transistor 2 becomes conductive, which causes the voltage at the gate of the transistor 1 to decrease and to limit the current.

The gate of transistor 1 and the collector of transistor 2 are connected together and via two series-arranged load resistors 9, 14 are connected to the modulation terminal of the integrated circuit, and the junction 20 of these two resistors is connected via a coupling capacitor 12 to the reference terminal 10 of the integrated circuit. Furthermore, the emitter-base junction of the second transistor 2 is shunted by a capacitor 5.

The arrangement operates as follows: through the alternating current path formed by capacitor 12, voltage is negatively fed back via the resistor 9 to the gate of transistor 1, for alternating current only. As the base-emitter junction of transistor 2 is shunted by a capacitor, this transistor can only produce a direct current and its collector output impedance is consequently very large for alternating current. The negative feedback is therefore not substantially decreased by the presence of transistor 2 in parallel with the gate of the transistor 1, and consequently a total negative feedback is involved. For alternating current this therefore provides a dynamic impedance of the field effect transistor equal to the inverse of its slope. A customary value of 250 mA/V for this slope consequently results in a dynamic resistance of 4 ohms for transistor 1. Such a series resistance in the line does not disturb the modulation.

The French standard provides a variable supply voltage for which a current less than 60 mA must be maintained. It also provides that the current may reach a peak value of 150 mA during 150 mS, it being a requirement that the current returns again to a value of at least 60 mA in less than 400 mS.

Since the negative feedback ensures, for alternating current, a low dynamic impedance for the transistor 1, a rapid transient overvoltage on the line entails the risk that too high a transient current is produced on the line. The current measuring resistor is therefore formed by two series-arranged resistors 7, 8 and a third transistor 3 is provided which has its emitter, its base and its collector connected to respectively the terminal 18 of the rectifier bridge, to the junction of the two series-arranged measuring resistors 7, 8 and to the collector of the second transistor 2. In normal operation, the transistor 3 is non-conductive and plays no role in the above-described negative feedback.

The value of the resistor 8 is calculated so as to ensure that the transistor 3 starts conducting when the line current approaches 150 mA. Thus, one of the requirements of the standard is satisfied. In addition, a resistor 6 is arranged between the base of the second transistor 2 and current measuring resistor 7, which resistor 6, in association with the timing capacitor 5, introduces a time constant according to which transistor 2 may become active after a predetermined period of time to limit the current to the value desired for permanent operation. This time constant is lower than the time constant created by resistor 8 associated with third transistor 3. Thus, a still further requirement of the standard is satisfied in a very simple way.

If a high voltage is unintentionally applied to the line for a comparatively long time, this voltage will be applied predominantly to the terminals of transistor 1. In spite of the current limitation, this transistor then dissipates a high power. If, for example, the 220 V mains voltage is unintentionally applied to the line, with a current limited to, for example, 35 mA, the power dissipated by the transmitter 1 is higher than 5 watts.

In order to avoid the necessity of introducing a bulky and expensive arrangement for heat dissipation, the anode of a Zener diode 13 is connected to the base of the second transistor 2, the cathode being connected to the junction 20 between the two series-arranged load resistors 9, 14. Thus, when the voltage across the junction 20 exceeds a threshold voltage which is determined by the choice of the type of Zener diode, a current is applied to the base of transistor 2. Transistor 2 becomes conductive and completely cuts off transistor 1. So as to avoid the use of a high-voltage Zener diode, and to limit the power it dissipates, the cathode of the Zener diode is connected to the junction between the two load resistors, via a voltage divider formed by the resistors 11 and 22, one side of resistor 11 being thus connected to junction 20. The voltage divider tap is connected to the cathode of the diode while one end of resistor 22 is connected to conductor 180. A possible variation of circuit 27 (including the resistors 9, 11, 22) is shown at 28. The resistor 9 is divided into two parts 90 and 110 and the cathode of the Zener diode is then connected directly to the junction of the resistors 90 and 110, which then constitute at the same time a load resistor for transistor 2 and the divider for the Zener diode.

The integrated circuit 16 used in the FIG. 1 is of a type which incorporates the modulation functions and the multi-frequency dialling functions. If one wants to provide a pulsed dialling feature, the variation of the arrangement represented by FIG. 2 is used to the best advantage. The integrated circuit denoted by 160 is then, for example, of the TEA 1060 type. In this case the modulation terminal 4 and the supply terminal 15 are separate terminals. An application diagram supplied by the producer (PHILIPS) shows that these two terminals are interconnected via a line terminating resistor 140 having a value of approximately 600 ohms, and that a storage capacitor 120 is arranged between supply terminal 15 and reference terminal 10. Instead of only and simply adding to these components 140, 120 the arrangement shown in FIG. 1, it is advantageous to combine resistor 14 of FIG. 1 and resistor 140 into one single resistor 140, and to combine coupling capacitor 12 of FIG. 1 and storage capacitor 120 into one single capacitor 120. Then the resistor 9 of FIG. 1, which is given same reference numeral in FIG. 2, is connected to junction 20 of the resistor 140 and the capacitor 120. Moreover, the main current path of a PNP switching transistor 26 is arranged in the conductor from the collector of second transistor 2 to coupling capacitor 120, between load resistor 9 and junction 20. This transistor has for its object to control the dialling pulses, and is activated by a specific integrated circuit 25, for example of the type PCD 3325 (of the same manufacturer) which generates dialling signals from a keyboard, not shown. This circuit is connected in parallel with the circuit TEA 1060 between its terminals 10 and 15. To ensure an adequate biasing of transistor 26, its emitter is connected to the center tap of a divider formed by two resistors 23, 24 connected to the conductor 20 and to the terminal 10, respectively. In operation, this arrangement results in a shift of some volts d.c. of the voltage applied to the upper terminal of the resistor 9, which does not affect the operation of the arrangement. During a dialling pulse integrated circuit 25 triggers the cut off action of transistor 26. Then, because of a resistor 29 which is provided between the gate of transistor 1 and the connecting line 180, whatever the state of the transistor 2, the transistor 1 is rendered non-conducting and the line current is interrupted (the integrated circuits 16 and 25 continue to be supplied by storage capacitor 120). The further elements of FIG. 2 are identical to those shown in FIG. 1 and are given the same reference numerals.

Applicants have obtained satisfactory results by using the following components:

| semiconductors: | |
|---|---|
| 1: 2 N 3008 or 2 N 2408 | 26: BF 423 |
| 2 and 3: BC 547 | 16: TEA 1046 |
| 13: BZY 55 C 30 V | 160: TEA 1060 |
| 25: PCD 3325 | |

| resistances: | | capacitors: | |
|---|---|---|---|
| reference numeral | value (ohms) | reference numeral | value (microfarads) |
| 7 | 10 | | |
| 8 | 6,8 | 5 | 33 |
| 9 | 1 M | 12 and 120 | 100 |
| 11 | 1 M | | |
| 14 | 5600 | | |
| 22 | 330 K | | |
| 23 | 5600 | | |
| 24 | 5600 | | |
| 29 | 1 M | | |
| 90 | 330 K | | |
| 110 | 1 M | | |
| 140 | 560 | | |

The rectifier bridge 21 and the protection element 30, which are both well known components, may be of any type suitable for telephone sets. Obviously, the integrated circuits TEA 1060, TEA 1046 and PCD 3325 must be further accompanied by a plurality of discrete elements, not shown, to ensure different functions such as filtering, connection to the microphone and to the earpiece, etc. . . . These components are described in detail in the specifications of the relevant integrated circuits and are not changed in the arrangement according to the invention. Consequently, there is no need to describe them here.

It will be obvious that numerous equivalent components can be used instead of the components described, for example it is possible to use MOS transistors instead of certain bipolar transistors, a different type of threshold element instead of the Zener diode, the position of the total arrangement between the positive output of the rectifier bridge and the integrated circuit, etc. without departing from the scope of the invention.

What is claimed is:

1. An apparatus comprising an electronic interface circuit for a telephone set connected to a telephone line over which modulated signals are transmitted, said telephone set having a rectifier bridge circuit connected to said telephone line and an integrated circuit connected to said rectifier bridge circuit, said integrated circuit having a modulation terminal to which the modulated signals are applied and a reference terminal, said interface circuit comprising: first controlled impedance means having a control electrode and first and second output electrodes, said first output electrode being connected to said reference terminal; current-measuring resistor means connected between said bridge circuit and said second output electrode; and current regulating means connected to said current-measuring resistor means and to said control electrode for controlling the impedance of said first controlled impedance means; the improvement consisting of negative feedback means for limiting current in said telephone line, said negative feedback means comprising:
   first and second load resistance means connected at a common junction and connected in series between said control electrode of said first controlled impedance means and said modulation terminal; and
   capacitor means connecting said common junction to said reference terminal;
   said first load resistance means and said capacitor means providing negative feedback from said first output terminal of said first controlled impedance means to said control electrode thereof, thereby reducing the impedance of said first controlled impedance means for modulated signals transmitted over the telephone line.

2. Apparatus as set forth in claim 1, wherein said first controlled impedance means comprises a field effect transistor.

3. Apparatus as set forth in claim 2, wherein said current regulating means comprises a transistor.

4. Apparatus as set forth in claim 3, further comprising delay means connected to said current regulating means and to said current-measuring resistor means for causing said current regulating means to increase the impedance of said first controlled impedance means upon occurrence of a transient overvoltage condition on the telephone line.

5. Apparatus as set forth in claim 4, wherein said current regulating means has a control electrode and said delay means comprises: timing capacitor means connected to the control electrode of said current regulating means; a resistor connected between the control electrode of said current regulating means and said current-measuring resistor means; and second controlled impedance means having a control electrode, the control electrode of said second controlled impedance means being connected to said current-measuring resistor means.

6. Apparatus as set forth in claim 5, wherein said second controlled impedance means comprises a transistor.

7. Apparatus as set forth in claim 5, further comprising a Zener diode connected between the control electrode of said current regulating means and said common junction of said first and second load resistance means.

8. Apparatus as set forth in claim 7, further comprising voltage divider means interconnected between said Zener diode and said common junction.

9. Apparatus as set forth in claim 1, wherein said integrated circuit further has a supply terminal, and said apparatus further comprises: a line terminating resistor connected between said supply terminal and said modulation terminal, and a storage capacitor connected between said supply terminal and said reference terminal; said line terminating resistor constituting said first load resistance means and said storage capacitor constituting said capacitor means.

10. Apparatus as set forth in claim 9, further comprising dialing signal generator means and means for interrupting line current during operation of said dialing signal generator means.

11. Apparatus as set forth in claim 10, wherein said interrupting means comprises: a switching transistor having a base connected to said dialing signal generator means and an emitter-collector current path which is connected to said capacitor means and said line, and resistor means connected in series with said emitter-collector current path of said switching transistor.

* * * * *